United States Patent
Berens

(10) Patent No.: US 8,238,495 B2
(45) Date of Patent: Aug. 7, 2012

(54) METHOD AND APPARATUS FOR REDUCING THE INTERFERENCES BETWEEN A WIDEBAND DEVICE AND A NARROWBAND INTERFERER

(75) Inventor: Friedbert Berens, Geneva (CH)

(73) Assignee: STMicroelectronics SA, Montrouge (FR)

( * ) Notice: Subject to any disclaimer, the term of this patent is extended or adjusted under 35 U.S.C. 154(b) by 1254 days.

(21) Appl. No.: 11/994,152

(22) PCT Filed: Jun. 26, 2006

(86) PCT No.: PCT/EP2006/006127
§ 371 (c)(1),
(2), (4) Date: Dec. 28, 2007

(87) PCT Pub. No.: WO2007/003297
PCT Pub. Date: Jan. 11, 2007

(65) Prior Publication Data
US 2008/0205491 A1     Aug. 28, 2008

(30) Foreign Application Priority Data
Jun. 30, 2005     (EP) ..................... 05014159

(51) Int. Cl.
*H04B 14/06*     (2006.01)

(52) U.S. Cl. ........ 375/346; 375/316; 375/353; 329/311; 332/106; 455/130

(58) Field of Classification Search .................... 375/346
See application file for complete search history.

(56) References Cited

U.S. PATENT DOCUMENTS

| | | | | |
|---|---|---|---|---|
| 4,879,606 A * | 11/1989 | Walter et al. | .................. | 386/308 |
| 5,287,180 A * | 2/1994 | White | ........................... | 348/484 |
| 5,488,632 A * | 1/1996 | Mason et al. | ................. | 375/260 |
| 5,758,275 A * | 5/1998 | Cox et al. | ....................... | 455/307 |
| 6,084,919 A * | 7/2000 | Kleider et al. | ................ | 375/285 |
| 6,490,314 B1 * | 12/2002 | Khayrallah et al. | .......... | 375/132 |
| 6,510,147 B1 * | 1/2003 | Sun et al. | ....................... | 370/335 |
| 6,570,527 B1 * | 5/2003 | Lindskog et al. | .............. | 342/174 |
| 6,574,266 B1 * | 6/2003 | Haartsen | ....................... | 375/133 |
| 6,952,594 B2 * | 10/2005 | Hendin | ....................... | 455/552.1 |
| 7,171,161 B2 * | 1/2007 | Miller | ........................ | 455/67.11 |
| 7,342,973 B2 * | 3/2008 | Walker et al. | ................. | 375/260 |
| 2002/0085641 A1 * | 7/2002 | Baum | ........................... | 375/260 |

(Continued)

OTHER PUBLICATIONS

Heydari, A Study of Low-Power Ultra Wideband Radio Transceiver Architectures, Wireless Communications and Networking Conference, Mar. 13-17, 2005, pp. 758-763.

*Primary Examiner* — David Ometz
*Assistant Examiner* — Santiago Garcia
(74) *Attorney, Agent, or Firm* — Allen, Dyer, Doppelt, Milbrath & Gilchrist, P.A.

(57) ABSTRACT

A method includes a main interference reduction mode for reducing the interference generated by a wideband device toward a narrowband device. The main interference reduction mode is performed within the wideband device and includes at least one of detecting an emission from and a reception performed by the narrowband device. A group of at least one sub-carrier having frequencies interfering with frequencies used by the narrowband device is determined from the detection step. The bits of the punctured stream that correspond to the information carried by the interfering sub-carriers of the group are determined and processed so that the processed bits are mapped into a reference symbol having an amplitude within a threshold of zero.

53 Claims, 14 Drawing Sheets

U.S. PATENT DOCUMENTS

| | | | |
|---|---|---|---|
| 2002/0155811 A1* | 10/2002 | Prismantas et al. | 455/63 |
| 2003/0064739 A1* | 4/2003 | Lindskog et al. | 455/504 |
| 2003/0198283 A1* | 10/2003 | Patel et al. | 375/147 |
| 2004/0028011 A1* | 2/2004 | Gehring et al. | 370/330 |
| 2004/0081127 A1* | 4/2004 | Gardner et al. | 370/338 |
| 2004/0233972 A1* | 11/2004 | Karaoguz | 375/130 |
| 2005/0032514 A1* | 2/2005 | Sadri et al. | 455/423 |
| 2005/0058217 A1* | 3/2005 | Sandhu et al. | 375/267 |
| 2005/0105657 A1* | 5/2005 | Kroeger et al. | 375/347 |
| 2005/0201498 A1* | 9/2005 | Nakai | 375/346 |
| 2006/0014506 A1* | 1/2006 | Haartsen | 455/227 |
| 2006/0083338 A1* | 4/2006 | Giannakis et al. | 375/343 |
| 2006/0252373 A1* | 11/2006 | Huh et al. | 455/41.2 |
| 2007/0110198 A1* | 5/2007 | Skarby et al. | 375/349 |
| 2008/0037611 A1* | 2/2008 | Coon | 375/145 |
| 2008/0205491 A1* | 8/2008 | Berens | 375/148 |
| 2008/0297415 A1* | 12/2008 | Berens et al. | 342/372 |
| 2009/0088092 A1* | 4/2009 | Wang et al. | 455/114.2 |
| 2009/0110033 A1* | 4/2009 | Shattil | 375/141 |
| 2009/0147832 A1* | 6/2009 | Kim et al. | 375/144 |
| 2009/0161774 A1* | 6/2009 | Liu et al. | 375/260 |
| 2009/0252096 A1* | 10/2009 | Liu et al. | 370/329 |

* cited by examiner

METHOD AND APPARATUS FOR REDUCING THE INTERFERENCES BETWEEN A WIDEBAND DEVICE AND A NARROWBAND INTERFERER

FIELD OF THE INVENTION

The invention relates to the wireless communication systems, and, more particularly, to the processing of interference within different wireless communication apparatuses.

A non-limiting application is directed to devices operating according to the Ultra Wide Band (UWB) standard based on OFDM (Orthogonal Frequency-Division Multiplexing), called MBOA (Multiband OFDM Alliance), which can generate interferences toward a WIMAX device which is a fixed wireless device (Worldwide Interoperability for Microwave Access). Such a WIMAX device operates for example with a bandwidth of 20 MHz at a central frequency of 3.5 GHz, whereas the frequency band of the MBOA system lies between 3.1 and 5.0 GHz.

BACKGROUND OF THE INVENTION

Wireless personal area networks based on OFDM and UWB technologies like the MBOA standard may directly interfere with narrowband devices which are close to such wideband devices. At present, no specific interference mitigation techniques are implemented in the UWB standard based on OFDM (MBOA).

Orthogonal frequency-Division Multiplexing (OFDM) is a method of digital modulation in which a signal is split into several narrowband channels (sub-carriers) at different frequencies. In order to avoid in-band spectral interference, WO 2005/006698 (INTEL) proposes to puncture, i.e. remove, selected sub-carriers. More precisely, this puncturing is made, taking into account channel knowledge, after the OFDM modulation in the transmitter, whereas a depuncturing is performed in the receiver before the OFDM demodulator. Because of the puncturing of some sub-carriers, the size of the encoded block of data which may be converted into OFDM symbols has to be reduced. Consequently, not only the software of the MAC ("Medium Access Control") entity of the UWB device may be modified to take into account this size reduction of the data block, but the receiver needs to know the actual used puncturing scheme, for example through the transfer of control information from the transmitting device to receiving device, leading to an interruption of the transmission of the useful data between the transmitting device and the receiving device.

SUMMARY OF THE INVENTION

An aim is to minimize the interference to an in-band narrowband victim device without needing any modification in the control layer, for example the MAC layer, of the wideband device, and without needing any additional communication overhead on the air.

Another approach permits communication between devices implementing the invention and devices not implementing the invention.

According to an embodiment, it is thus proposed a method for reducing the interference between a main device, for example a UWB MBOA device, adapted to transmit information on sub-carriers having frequencies belonging to a main band of frequencies and at least one auxiliary device, for example a WIMAX device, adapted to emit and/or receive information within an auxiliary band of frequencies, the auxiliary band being narrower than the main band and included within the main band. The information transmitted on the sub-carriers by the man device are issued from symbols obtained by a mapping of a punctured scheme of bits according to a modulation mapping scheme.

According to this aspect, the method comprises a main interference reduction mode for reducing the interference generated by the main device toward the auxiliary device. The main interference reduction mode is performed within the main device and includes detecting an emission from and/or reception performed by the auxiliary device, determining from the detection step a group of at least one sub-carrier having frequencies interfering with the auxiliary band of frequencies, determining the bits of the punctured stream which correspond to the information carried by the interfering sub-carriers of the group, and processing the determined bits such that the processed bits are mapped into a reference symbol having an amplitude equal or close to zero.

Thus, after OFDM modulation of such a reference symbol, the corresponding sub-carrier is not or almost not modulated. In other words, no energy or almost no energy is transmitted on this sub-carrier so that the interference may be minimized if not eliminated because this interfering sub-carriers have been notched out or almost notched out.

However, there is no modification of the size of the data block and no modification in the software of the MAC layer. In fact, the sub-carrier notching according to this aspect leads to a loss of transmitted information. In other words, from the receiving device point of view, the user may consider that he does not receive any information or that he receives a high level of noise. Accordingly, after OFDM demodulation and demapping, the corresponding soft bits may have a very low reliability leading to a appropriate correction during the decoding step.

Furthermore there is no need to inform the receiving terminal. Thus the method according to this aspect can be considered as being a blind or seamless method of sub-carrier notching.

As an example, a 20 MHz narrowband carrier which can be the width of the auxiliary band of the auxiliary device (for example the WIMAX device) corresponds to only 1.3% of the used UWB spectrum of a MBOA based device and corresponds for example to an interfering sub-carrier group of 5 or 7 sub-carriers. This leads to a small amount of lost transmitted information which does not affect the performance of the device.

More generally, the larger the width of the auxiliary band of the auxiliary device is, the more the number of interfering sub-carriers to be notched out is important and the more the consequence on the communication performance is important. Accordingly, one skilled in the art will be able to decide whether or not the invention can be applied for a given narrowband device depending on the desired communication performance.

However, narrowband devices having bandwidth smaller than 5 to 10% of the main bandwidth (the bandwidth of the main device) are perfectly compatible with this aspect.

The reference symbol is preferably chosen within a group of several reference symbols having respectively different amplitudes, each amplitude being equal or close to zero. For example, this reference symbol or neutral symbol can be chosen among a set of for example four values. The corresponding sub-carriers could then be controlled in their transmit power. The lowest value of the reference symbol would completely notch out the carrier whereas higher values would only attenuate the related sub-carriers. By doing so, some part of the cancelled information could still be transmitted and thus a slight improvement of the communication performance could be reached. Furthermore, choosing a reference symbol having a value close to zero but not equal to zero would render the implementation of the radio frequency stage of the apparatus easier than with a reference symbol having a zero value.

According to an embodiment, the processing step of the determined bits comprises associating a control indication to each determined bit, and bits associated with the control indication are mapped into the reference symbol.

For example, the processing step comprises associating a control bit to each bit of the punctured stream, the control bit having a first logical value corresponding to the control indication or a second logical value. The bits associated with control bits having the second logical value are mapped into their corresponding symbols in accordance with the modulation mapping scheme, whereas the bits associated with control bits having the first logical value are mapped into the reference symbol.

Whereas the wideband device generates interference toward the narrowband device, there is also an in-band interference generated by the narrowband device in the wideband device even if it is less important. According to another embodiment, it is thus possible to minimize such interference generated by the narrowband device toward the wideband device.

More precisely, according to such an embodiment, in which the main device is also adapted to receive information carried by the sub-carriers and to perform a reception processing including determining received symbols from the received information and demapping the received symbol for providing a punctured stream of soft bits (each soft bit having a sign representative of the estimation of the logical value of the corresponding bit and a magnitude representative of the confidence in the estimation), the method further comprises an auxiliary interference reduction mode for reducing the interference generated by the auxiliary device (the narrowband device) toward the main device. The auxiliary interference reduction mode is performed within the main device and includes replacing the soft bits corresponding to the information received on the interfering sub-carriers with neutral soft bits having a magnitude equal to zero.

Thus, such a neutral soft bit may be considered having a very low reliability which may be taken into account into the decoding step. The interference coming from the auxiliary device is thus minimized.

According to an embodiment, the detecting step of the main interference reduction mode comprises analyzing channel state information and detecting the operation of the at lest one auxiliary device from the channel state information. Such channel state information can be delivered, for example, by a channel estimator generally incorporated in the wireless apparatus.

However, the detecting step preferably further comprises checking the operation detection by using a set of stored interference information respectively associated to a set of several different auxiliary devices.

In other words, in order to optimize the notching process, according to the invention, the spectral properties of the potential victim device (the auxiliary device) can be taken into account in the definition process of the bits to be mapped into the reference symbol. Usually, a limited amount of possible devices can be assumed as victim devices in the corresponding transmission band of the main device. These devices (e.g. WIMAX devices) are well defined and thus the bandwidth and the potential carrier frequencies in use are well known. By using this information, it is much easier to define the sub-carriers to be notched out based on the channel state information. By using this knowledge, notching groups can be predefined and easily set up. For example, a sub-carrier group of 5 or 7 sub-carriers can be defined for a WIMAX device with a bandwidth of 20 MHz. The requirements on the frequency domain channel state information can thus be relaxed.

The main interference reduction mode advantageously comprises regularly checking the operation of the auxiliary device and if the auxiliary device is not detectable, the main interference reduction mode concerning the not detectable auxiliary device is stopped.

According to a variant, the main device and the at least one auxiliary device are all together incorporated within a single wireless communication apparatus. Thus, with such an embodiment, it is possible to have the simultaneous operation of two different air interfaces within a single wireless apparatus, for example a single mobile terminal, while the mutual interference is minimized if not eliminated.

With such a collocation variant, an indication of the group of at least one sub-carrier having frequency interfering with the auxiliary band of frequencies of the auxiliary device, is advantageously stored within the apparatus, and the detecting step of the main interference reduction mode comprises advantageously receiving from the auxiliary device an auxiliary control information representative of the operation or of the non-operation of the auxiliary device such that the main interference reduction mode is performed during the operation of the auxiliary device.

Several different auxiliary devices may be respectively adapted to emit and/or receive information within several different auxiliary bands of frequency, each auxiliary band being narrower than the main band and included within the main band. In such a case, the main interference reduction mode may be performed for at least some of the several different auxiliary devices.

Another possibility exists according to the invention for mitigating the interference between the main wideband device and the narrowband device. More precisely, according to an embodiment, the method comprises an additional interference reduction mode for reducing the interference between the main device and the at least on auxiliary device. The additional interference reduction mode is performed within the main device and includes detecting an emission from and/or a reception performed by the at least one auxiliary device determining from the detection step a group of at least one sub-carrier having frequencies interfering with the auxiliary band of frequencies, and shifting at least a part of the main band of frequencies including the group with a chosen frequency shift.

Of course, one skilled in the art will adapt the frequency shift such that, after shifting, the shifted part remains within the limits of the main band while being compatible with the non-shifted part of the main band of frequencies.

The frequency shift is, for example, at least equal to the width of the frequency band of the at least one auxiliary device.

When the main band of frequencies is subdivided into several different mutually spaced sub-bands, the shifting step comprises shifting at least the sub-band which contains at least a part of the group of interfering sub-carriers.

As for the notching variant, the detecting step of the additional interference reduction mode (the shifting variant) comprises, for example, analyzing a channel state information and detecting the operation of the at least one auxiliary device from the channel state information, and preferably checking the operation detection by using a set of stored interference information respectively associated to a set of several different auxiliary devices.

The additional interference reduction mode may also comprise regularly checking the operation of the auxiliary device and if the auxiliary device is not detectable, the additional interference reduction mode concerning the not detectable auxiliary device is stopped.

When the at least one auxiliary device and the main device are all together incorporated within a single wireless communication apparatus, the detecting step of the additional interference reduction mode comprises advantageously, for the main interference reduction mode, the reception from the auxiliary device of an additional control information representative of the operation or of the non-operation of the auxiliary device such that the additional interference reduction mode is performed only during the operation of the auxiliary device.

Depending on the location of the auxiliary frequency band within the main band of frequencies, either the main interference reduction mode (notching mode) or the additional interference reduction mode (shifting mode) can be selected.

It is also possible that both the main interference reduction mode and the additional interference reduction mode are performed for a same auxiliary device. For example, a shifting of a part (for example a sub-band) of the main band of frequencies can be performed to eliminate the interference carried by some sub-carriers whereas the notching option is performed for the remaining interfering sub-carriers which are still within the main band of frequency after the shifting step.

It is also possible that the main interference reduction mode and the additional interference reduction mode are respectively performed for different auxiliary devices.

The main device can belong to a multi-carrier based Ultra Wide Band Communication system, for example but not exclusively, an OFDM based Ultra Wide Band Communication system.

The at least one auxiliary device may belong to a fixed wireless system (FWA, fixed wireless access) like a WIMAX system. However, it is also possible that such an auxiliary device belongs to a mobile radio system defined by a mobile radio standard like for example UMTS, GSM, CDMA, EDGE, beyond IMT-2000 systems, or to a fixed satellite system (FSS), if the frequency band of the mobile radio system or the satellite system is located within the main frequency band of the main device.

According to another aspect, it is also proposed a wireless communication apparatus comprising a main device having a main transmission chain including puncturing means or circuitry for delivering a punctured stream of bits, mapping means or circuitry for delivering symbols from the punctured stream of bits in accordance with a modulation mapping scheme, and a transmission stage for transmitting information issues from the symbols on sub-carriers having frequencies belonging to a main band of frequencies. The main device further includes main reduction interference means or circuitry for reducing the interferences generated by the main device toward the at least one auxiliary device adapted to emit and/or receive information within the auxiliary band of frequencies, the auxiliary band being narrower than the main band and included within the main band. The main interference reduction means or circuitry includes main detection means or circuitry for detecting an emission from and/or a reception performed by the auxiliary device, a main control unit connected to the main detection means or circuitry for determining a group of at least one sub-carrier having a frequency interfering with the auxiliary band of frequencies and determining the bits of the punctured stream which correspond to the information carried by the interfering sub-carriers of the group, and a main processing unit for processing the determined bits such that the mapping means or circuitry are adapted to map the processed bits into a reference symbol having an amplitude equal or close to zero.

According to an embodiment, the main processing unit is adapted to associate a control indication to each determined bit, and the mapping means or circuitry are adapted to map the bits associated with the control indication to the reference symbol.

According to an embodiment, the main processing unit is adapted to associate a control bit to each bit of the punctured stream, the control bit having a first logical value corresponding to the control indication, or a second logical value, and the mapping means or circuitry are adapted to map the bits associated with the control bits having the second logical value into their corresponding symbols in accordance with the modulation scheme.

According to an embodiment, the main device further comprises a reception chain including a receiving stage for receiving information carried by the sub-carriers and delivering received symbols from the received information, and demapping means or circuitry for demapping the received symbols according to the modulation scheme and delivering a punctured stream of soft bits, each soft bit having a sign representative of the estimation of logical value of the corresponding bit and a magnitude representative of the confidence in the estimation.

The main device further comprises auxiliary interference reduction means or circuitry for reducing the interference generated by the auxiliary device toward the main device, the auxiliary interference reduction means or circuitry including an auxiliary processing unit for replacing the soft bits corresponding to the information received on the interfering sub-carriers by neutral soft bits having a magnitude equal to zero.

According to an embodiment, the apparatus further comprises a channel estimation unit adapted to deliver channel state information and the main detection means or circuitry comprises main analyzing means or circuitry for analyzing the channel state information and detecting the operation of the at least one auxiliary device from the channel state information.

The apparatus may further comprise main memory means or circuitry for storing a set of interference information respectively associated to a set of several different auxiliary devices, and main checking means or circuitry for checking the operation detection by using the stored set of interference information.

The apparatus may also further comprise a main management unit adapted to manage the operation of the main interference reduction means or circuitry and the main interference reduction means or circuitry are further adapted to regularly check the operation of the auxiliary device and if the auxiliary device is not detectable, the main management unit is adapted to stop the interference reduction concerning the not detectable auxiliary device. The apparatus may incorporate the main device and the at least one auxiliary device all together. In such a case, the apparatus may further comprise a main management unit adapted to manage the operation of the main interference reduction means or circuitry and auxiliary memory means or circuitry for storing an indication of the group of at least one sub-carrier having frequencies interfering with the auxiliary band of frequencies of the auxiliary device. The auxiliary device comprises auxiliary control means or circuitry for delivering an auxiliary control information representative of the operation or of the non-operation of the auxiliary device such that the main management unit is adapted to allow the operation of the main interference reduction means or circuitry only during the operation of the auxiliary device.

According to an embodiment, several different auxiliary devices are respectively adapted to emit and/or receive information within several different auxiliary bands of frequencies, each auxiliary band being narrower than the main band and included within the main band, and the main interference reduction means or circuitry are adapted to reduce the interference generated by the main device toward at least some of the several different auxiliary devices. According to another variant, the apparatus further comprises additional interference reduction means or circuitry for reducing the interference between the main device and the at least one auxiliary device, the additional interference reduction means or circuitry including additional detecting means or circuitry for detecting an emission from and/or a reception performed by the at least one auxiliary device, and an additional control unit connected to the additional detecting means or circuitry for determining a group of at least one sub-carrier having frequencies interfering with the auxiliary band of frequencies, and for shifting at least a part of the main band of frequencies including the group, with a chosen frequency shift.

When the main band of frequencies is subdivided into several different mutually spaced sub-bands, the additional control unit is adapted to shift at least the sub-band which contains at least a part of the group of interfering sub-carriers.

According to an embodiment, the apparatus further comprises a channel estimation unit adapted to deliver channel state information, and the additional detection means or circuitry comprises additional analyzing means or circuitry for analyzing the channel state information and detecting the operation of the at least one auxiliary device from the channel state information. Additional memory means or circuitry may be provided for storing a set of interference information respectively associated to a set of several different auxiliary devices, and additional checking means or circuitry may check the operation detection by using the stored set of interference information. An additional management unit may be provided for managing the operation of the additional interference reduction means or circuitry. The additional interference reduction means or circuitry may be further adapted to regularly check the operation of the auxiliary device, and, if the auxiliary device is not detectable, the additional management unit is adapted to stop the interference reduction concerning the not detectable auxiliary device.

When the main device and the at least one auxiliary device are all together incorporated within a single wireless communication apparatus, the apparatus comprises, according to an embodiment, an additional management unit adapted to manage the operation of the additional interference reduction means or circuitry and additional memory means or circuitry for storing an indication of the group of at least one sub-carrier having frequencies interfering with the auxiliary band of frequencies of the auxiliary device. The auxiliary device comprises auxiliary control means or circuitry for delivering an auxiliary control information representative of the operation or of the non-operation of the auxiliary device such that the additional management unit is adapted to allow the operation of the main interference reduction means or circuitry only during the operation of the auxiliary device.

Both the main interference reduction means or circuitry and additional interference reduction means or circuitry may be adapted to perform their respective interference reduction for a same auxiliary device or for different auxiliary devices, respectively. Both main and additional detecting means or circuitry may be identical as well as both main and additional control units.

BRIEF DESCRIPTION OF THE DRAWINGS

Other advantages and features will appear on examining the detailed description of embodiments, these being in no way limiting, and of the appended drawings in which.

DETAILED DESCRIPTION OF THE PREFERRED EMBODIMENTS

Figure 1:
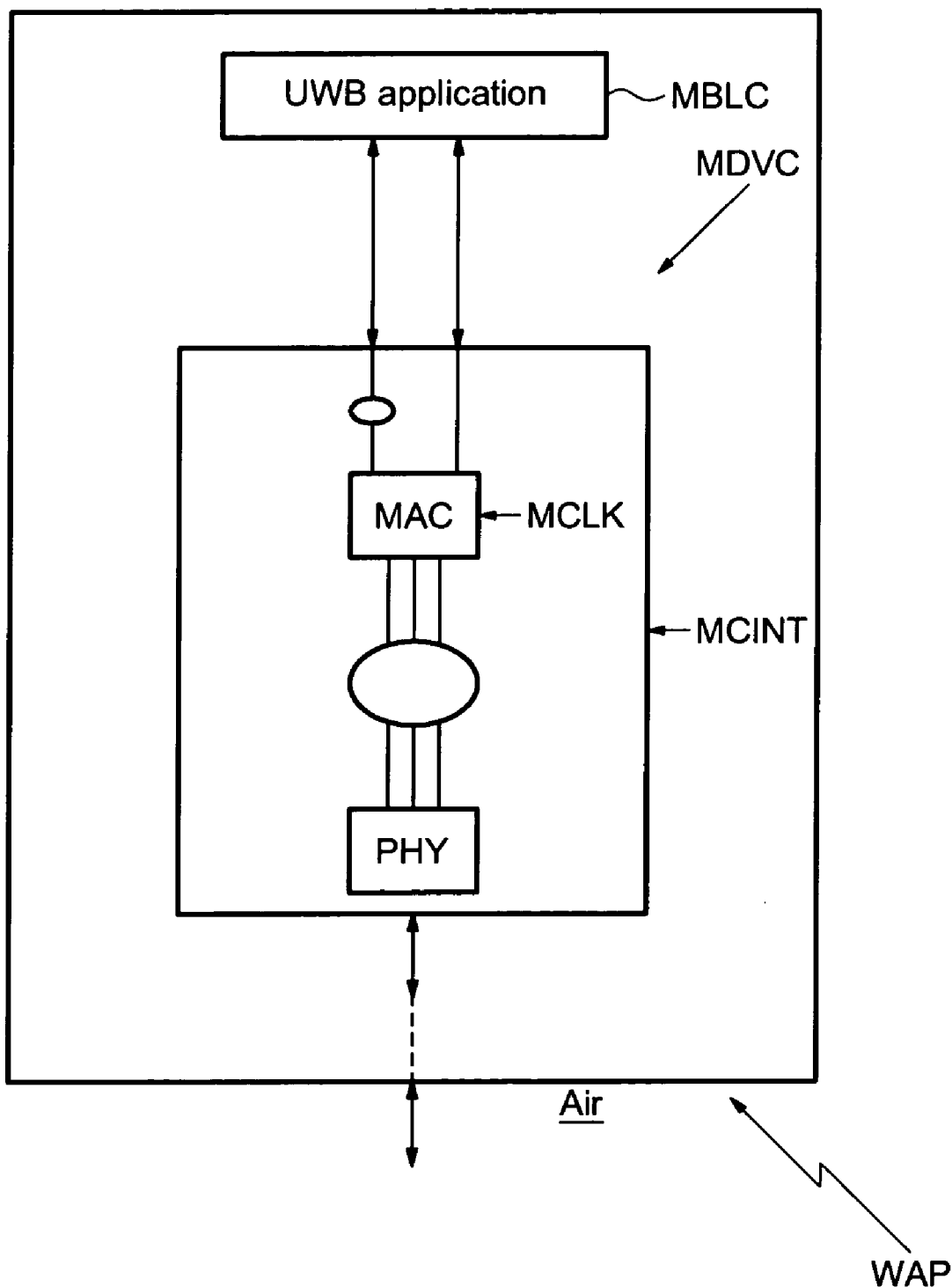
FIG. 1 illustrates diagrammatically the internal protocol structure of a wireless communication apparatus according to an embodiment of the invention.

FIG. 1 discloses an example of a wireless communication apparatus WAP belonging to a non-coordinated communication system such as a WLAN ("Wireless Local Area Network") or a WEAN ("Wireless Personal Area Network").

Such a wireless apparatus WAP belongs for example to an OFDM based Ultra Wide Band Communication system. However, the invention is not limited to such an example and can apply more generally to generalized multi-carrier (GMC) systems in which the carriers are not necessarily orthogonal.

WPAN MAC protocols have a distributed nature where there is no central coordinator terminal or base station to assign the medium access. Thus, in contrast to a mobile radio terminal, a WPAN transceiver has much higher flexibility to allocate the transmission slot and formats. The allocation of the communication resources is a distributed process. The allocation to a specific time slot in the super frame can be modified from one superframe to the next. The controlling entity is the WPAN-MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received and network wide constraints like the already existing slot reservation.

An example of distributed WPAN-MAC is MBOA MAC. The proposed MBOA MAC standard draft is based on UWB technology and is planed to be used in the frequency band between 3.1 and 10.7 GHz. First implementations using the standard work in the frequency range between 3.1 GHz and 5.0 GHz.

The wireless apparatus WAP comprises a main device MDVC including an OFDM based UWB communication interface MCINT connected between the UWB application block MBLC and the air channel.

This communication interface MCINT comprises an UWB MAC layer clocked by a clock signal MCLK and connected to the PHY layer and to the UWB application block MBLC.

For further details concerning the MAC layer and the PHY layer of the communication interface MCINT, one skilled in the art may refer to MBOA PHY layer Technical Specification, Version 1.0, January 2005, and to MBOA MAC layer Technical Specification, Version 0v7, October 2004.

Figure 2:
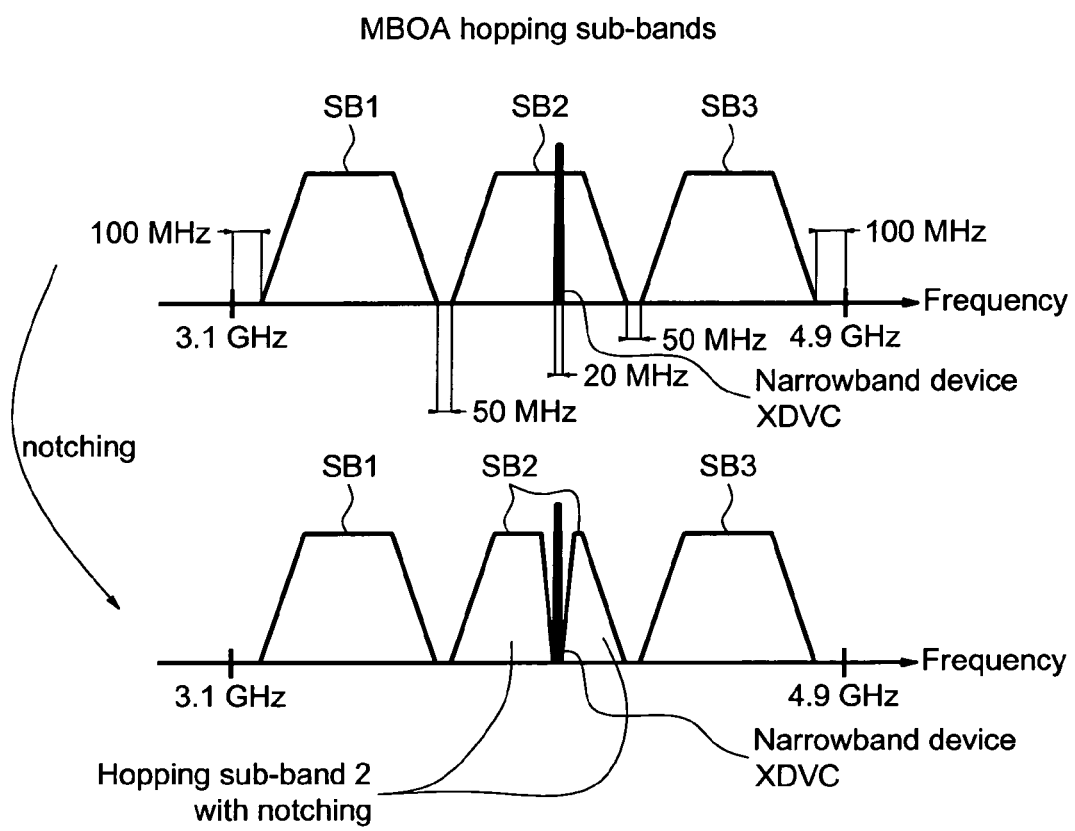
FIG. 2 illustrates a first embodiment of a method according to the invention.

The MAC layer manages in particular the emission/reception of the UWB data stream and is incorporated by software in a control processor. In FIG. 2 it can be seen that the main band of frequencies used for the operation (transmission and/or reception) of the main device MDVC lies between 3.1 GHz and 4.9 GHz. Further, the main frequency band is subdivided into three sub-bands SB1, SB2, SB3, called hopping sub-bands, which are mutually spaced. More precisely, there is a guard interval of 100 MHz between the lower limit (3.1 GHz) of the main frequency band and the beginning of the first sub-band SB1 as well as between the end of the third sub-band SB3 and the upper limit (4.9 GHz) of the main frequency band. Further, two adjacent sub-bands are spaced by a guard interval of 50 MHz.

The allocation of the sub-bands during the transmission is made according to a predetermined hopping sequence. In the upper part of FIG. 2, a narrowband device (auxiliary device) XDVC is assumed to operate in an auxiliary band of frequencies included within the second sub-band SB2. This auxiliary band of frequencies has a width of 20 MHz.

Compared to a UWB device based on techniques like MBOA standard, such a device XDVC is considered as being a narrowband device.

According to an aspect, which will be described more in details thereafter, based on the control of the transmission chain of the UWB main device MDVC, the frequencies used by the narrowband device are not used for the transmission of the UWB signal. The corresponding sub-carriers in hopping sub-band 2 are not used, i.e. are notched out so that the interference generated by the main UWB device MDVC toward the auxiliary device XDVC are greatly reduced if not eliminated.

Figure 3:
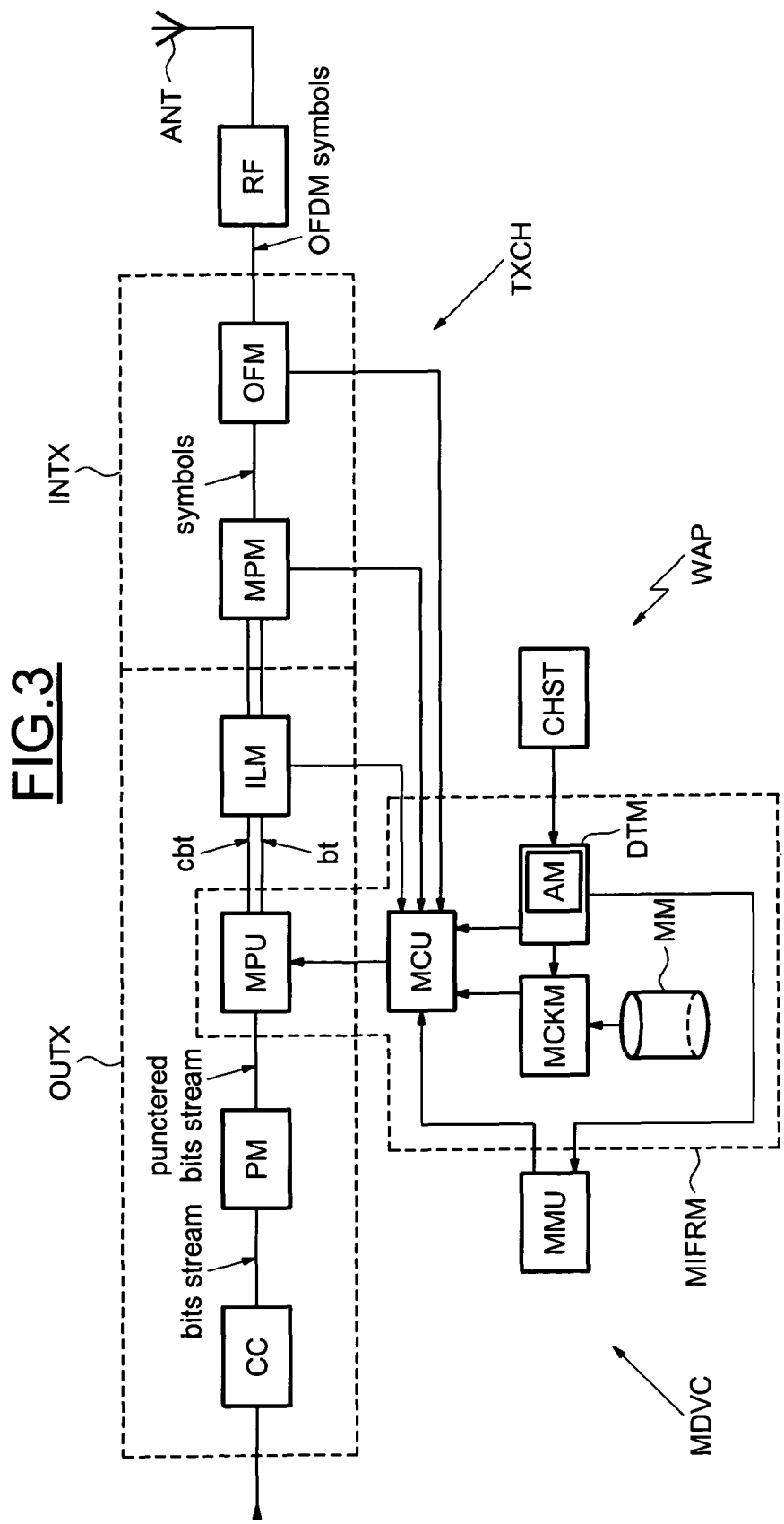
FIG. 3 illustrates more in detail but still diagrammatically, the internal structure of a wireless communication apparatus according to the invention.

Since the narrowband device only uses a very small portion of the UWB spectrum for its transmission, the sub-carrier notching can be done without a severe influence to the communication performance of the UWB device MDVC. In order to reduce these interferences by using such a notching process, the main device MDVC of the wireless communication apparatus WAP comprises main interference reduction means or circuitry MIFRM cooperating with the transmission chain TXCH of the main device (FIG. 3).

In a conventional manner, the transmission chain TXCH comprises an outer transmission block OUTX including an encoder CC, for example a convolutional encoder, receiving data from source coding means or circuitry and delivering a bit stream to puncturing means or circuitry PM which delivers a punctured bit stream.

The other conventional means or circuitry of the transmission chain TXCH are interleaving means or circuitry, ILM, followed by mapping means or circuitry MPM which map the bits into symbols according to a modulation mapping scheme depending on the kind of used modulation, for example a BPSK modulation or more generally a QAM modulation. The symbols are then delivered to an OFDM modulator OFM which performs IFFT processing in order to associate each symbol to a sub-carrier and to form OFDM symbols. Each sub-carrier is modulated in accordance with the value of the corresponding symbol.

The OFDM symbols are then processed in a conventional radio frequency stage RF before being transmitted on air through antenna ANT. The mapping means or circuitry MPM, as well as the OFDM modulator OFM, belong to an inner transmission block INTX of the transmission stage.

Figure 5:
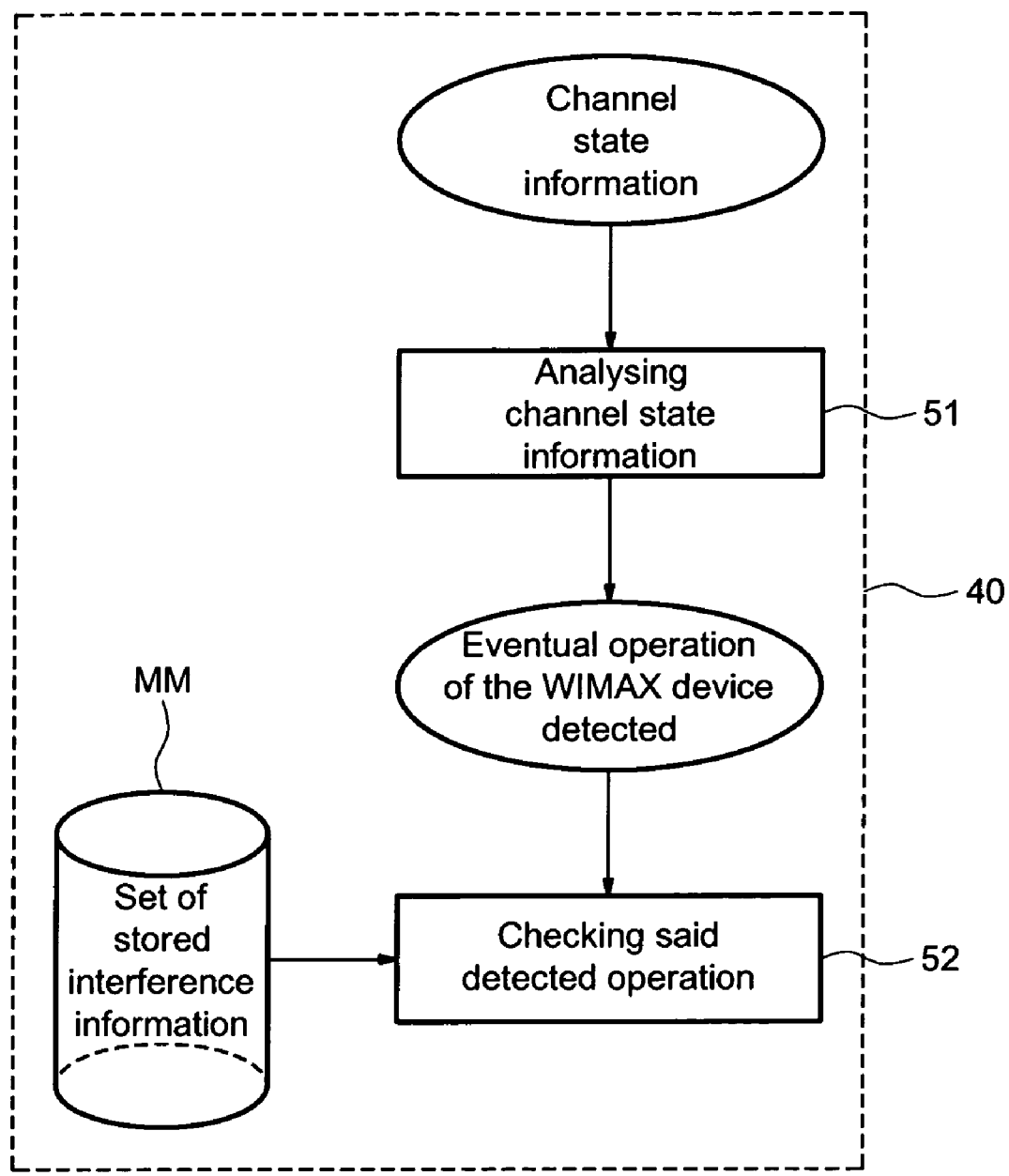
Figure 6:
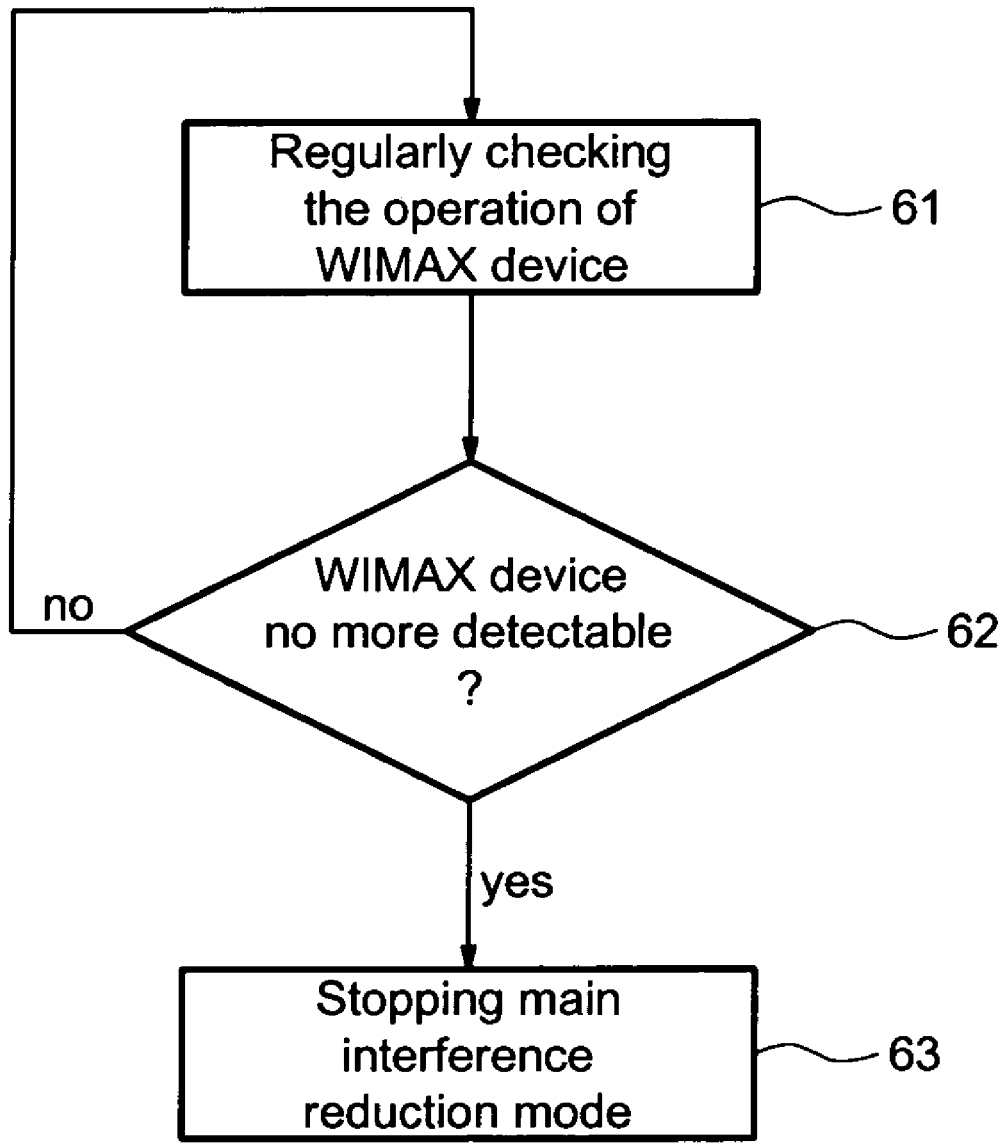

The operation of the main interference reduction means or circuitry MIFRM which are depicted in FIG. 3 will be now described with reference to FIG. 3 and FIG. 4 which depict the main interference reduction mode MIRM, and, also to FIGS. 5-7.

A conventional channel estimation unit CHST delivers a channel state information in the frequency domain. For example, this channel state information is an impulse response of the channel and contains for example, energy peaks at some frequencies. Main detection means or circuitry DTM comprises main analyzing means or circuitry AM for analyzing the channel state information and detecting the operation of the auxiliary device XDVC (step 40 in FIG. 4).

Although it is not compulsory, it is preferable that the eventual operation of the WIMAX device detected by the analyzing step 51 of the channel state information (FIG. 5) be checked (step 52, FIG. 5) by mean checking means or circuitry MCKM connected to main memory means or circuitry MM.

The main memory means or circuitry MM contains a set of stored interference information, in particular the interference information related to the auxiliary device XDVC. As a matter of fact, a limited amount of possible devices can be assumed as victim devices in the corresponding main transmission band of the main device. These auxiliary devices are well defined and thus a bandwidth and the potential carrier frequencies in use are well known. This information is stored in the main memory means or circuitry.

Using this knowledge notching groups can be predefined and easily set up.

A main control unit MCU connected to the main detection means or circuitry, is able to determine a group of interference sub-carriers, for example from analyzing the channel state information. These interfering sub-carriers can be validated by the checking operation performed by the main checking means or circuitry MCKM in accordance with the content of the main memory means or circuitry MM. More precisely, for example, if the group of interference sub-carriers determined by the main control unit MCU by using the information given by the main detection means or circuitry DTM corresponds to pre-stored interfering frequencies, thus, there is a high probability that the information given by the main detection means or circuitry actually corresponds to a well-defined auxiliary device, and not, for example, to noise on the air channel. The main control unit MCU may then determine the bits of the punctured stream of bits which correspond to the information carried by the interfering sub-carriers of the group.

As a matter of fact, the symbol mappings on the sub-carriers and the interleaver structure is a fixed value parameter in the standard for a given transmission mode. Thus, it can be stored as a fixed value and needs not to be recalculated. In other words, there is a one-to-one mapping (one-to-one correspondence) between a bit of the punctured bits stream and a sub-carrier in the OFDM symbol.

Thus, the determined bits, corresponding to the interfering sub-carriers to be notched out, are processed in a main process unit MPU connected to the main control unit MCU and also connected between the main puncturing means or circuitry PM and the interleaving means or circuitry ILM.

Figure 7:
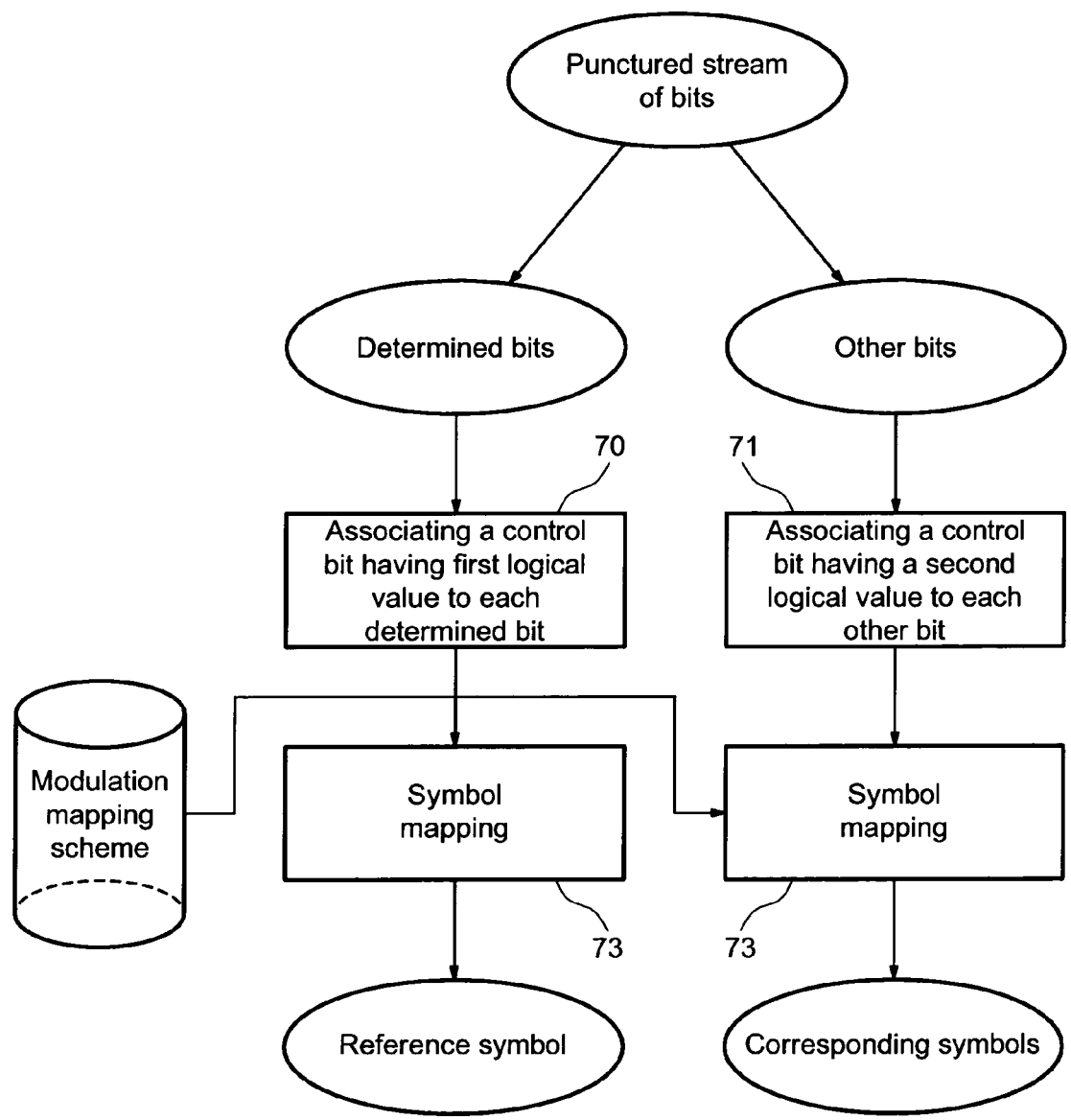

More precisely, the processing step 43, (performed after the determining step 42) comprises associating a control bit cbt having a first logical value (for example 1) to each determined bit and associating a control bit cbt having a second logical value (for example 0) to each other bits (steps 70-71, FIG. 7).

After interleaving, the bits are mapped into symbols in accordance with the chosen modulation. The bits which are associated with a control bit having the second logical value are mapped into their corresponding symbols according to the modulation mapping scheme (step 73, FIG. 7).

Figure 4:
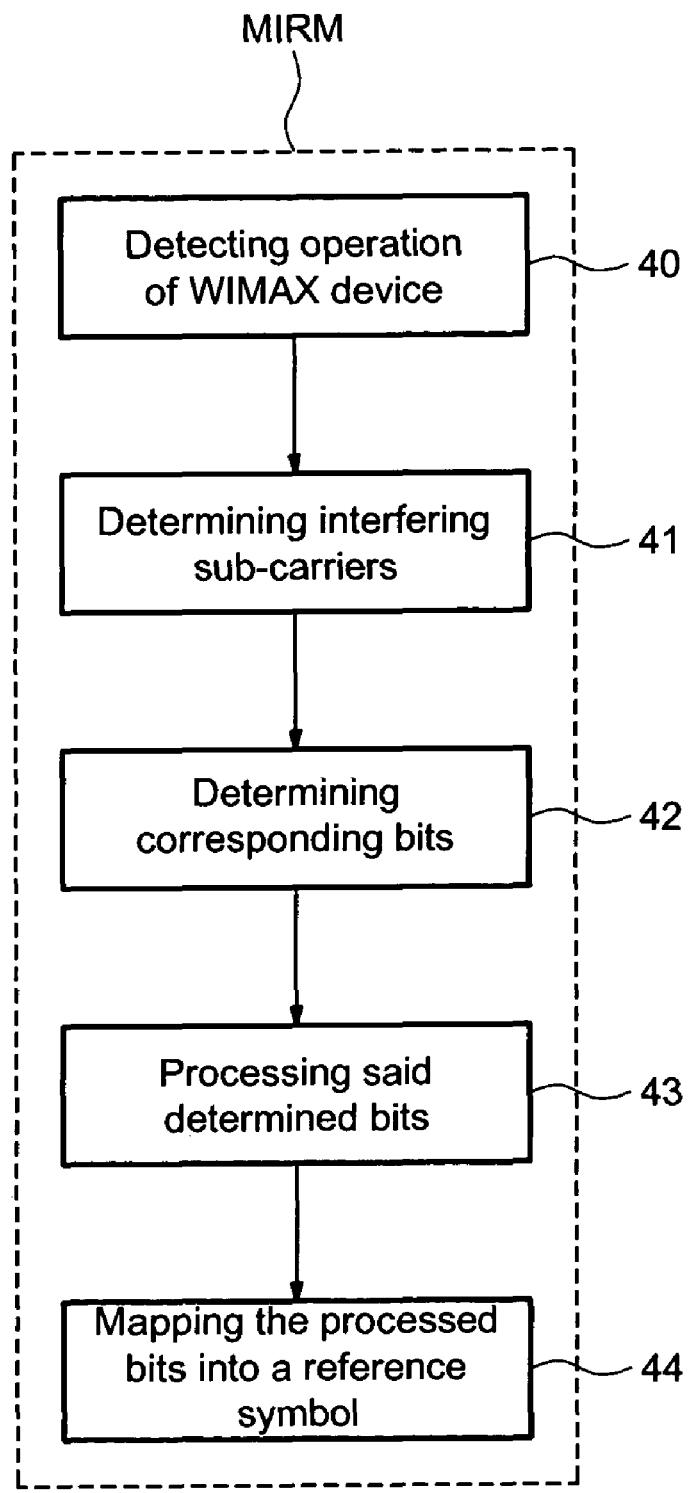
FIGS. 4-7 are flow charts related to an embodiment of a method according to the invention.

The bits determined during the determining step 42, which are associated with the control bit having the first logical value, are mapped into a reference symbol (step 44, FIG. 4 and step 73, FIG. 7). This reference symbol has an amplitude equal or close to zero.

After OFDM modulation, each sub-carrier is modulated in accordance with the value of the corresponding symbol. Thus, if the reference symbol has an amplitude equal or close to zero, no information or almost no information may be transmitted by this sub-carrier. In other words, the energy associated with this sub-carrier may be nul or almost nul. Thus, this sub-carrier is in fact notched out and no interference occurs between the main device and the auxiliary device.

Instead of using only one reference symbol, it is possible to choose a set of possible reference symbols, for example four reference symbols. The corresponding sub-carriers could then be controlled in their transmit power. The lowest value would completely notch out the carrier whereas the higher values would only attenuate the related sub-carrier. By doing so, some part of the cancelled information can be transmitted and thus a slight improvement of the communication performance could be reached. For example, the highest value of the reference symbol could be some percent (for example up to 2%) of the smallest amplitude of the normal symbols (the conventional symbols corresponding to the chosen modulation). In order, in particular, to improve the operation of the main device, it is preferable that the operation of the auxiliary device XDVC be regularly checked (step 61, FIG. 6). If the auxiliary device is not detectable (step 62) then, the main interference reduction mode is stopped (step 63). In this respect, the wireless communication apparatus WAP further comprises a main management unit MMU adapted to manage the operation of the main interference reduction means or circuitry MIFRM and to stop eventually their operation.

The main interference reduction means or circuitry MIFRM may be, for example, implemented in the PHY layer of the main device. The main management unit MMU may also be implemented in the PHY layer although it would be also possible for this main management unit to be implemented by software in the MAC layer.

Generally speaking, the main control unit, the main checking means or circuitry, the detection means or circuitry, and the main processing unit of the main interference reduction means or circuitry may be realized by software within a control processor and/or by hardware.

With this aspect, the block sizes of the bit stream to be handled are constant with and without the processing step 43. Thus, no major changes are needed in the following processing unit (interleaves, mapper and OFDM modulator). Further, no interaction in the transmission of the useful data is helpful to inform the receiver and no change in the MAC layer protocol is needed.

The MBOA standard needs only small changes in the physical layer PHY. Devices using this embodiment can communicate with devices not using this embodiment. Thus, a smooth introduction of the method according to this aspect with a backward compatibility can be supported.

The method according to this aspect can easily be combined with other mitigation techniques like power control and adaptive sub-carrier loading.

Only the UWB device that is interfering with the victim device can operate in the notching mode. For example, in a WIMAX system the home equipment is the only WIMAX device which can see the interference from a UWB device in the home. The uplink receiver at the base station is too far away from the UWB device to see any interference generated by the device. Thus it is not necessary to notch out the corresponding sub-carriers in the complete UWB piconet but only at the device closest to the potential victim receiver. The communication performance of all other devices is not influenced at all.

Figure 8:
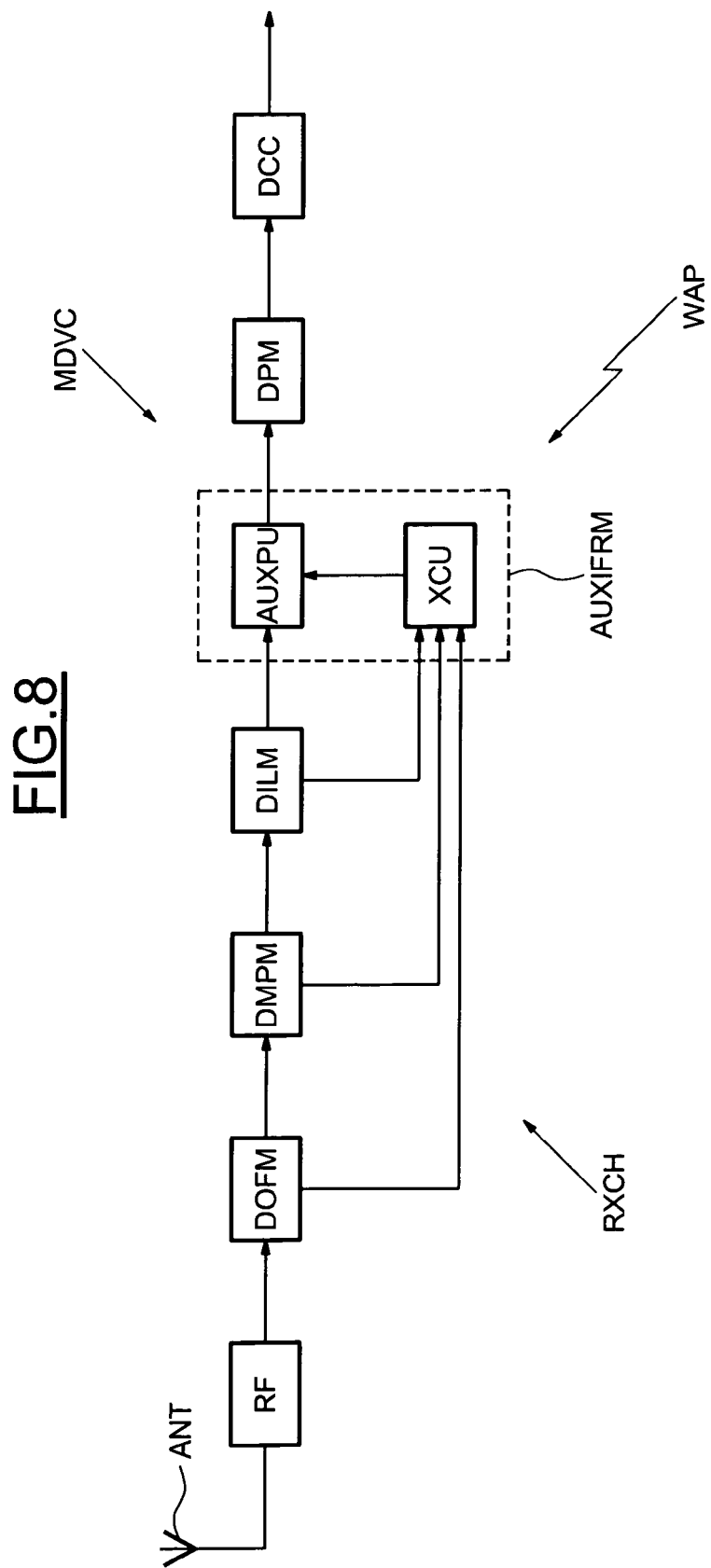
FIG. 8 illustrates diagrammatically another part of an internal structure of an embodiment of a wireless communication apparatus according to the invention.

As depicted in FIG. 8, the main device MDVC of the wireless communication apparatus WAP further comprises a reception chain RXCH including a receiving stage for receiving information carried by the sub-carriers and delivering received symbols from the received information. The receiving stage includes, in particular, a radio frequency stage RF connected to the antenna ANT followed by a OFDM demodulator DOFM (FFT processing).

The reception chain contains also demapping means or circuitry DMPM for demapping the received symbols according to the modulation scheme and delivering a punctured stream of soft bits to deinterleaver means or circuitry DILM.

A soft bit, for example a Log-Likelihood Ratio LLR, well-known by one skilled in the art, has a sign representative of the estimation of the logical value (0 or 1) of the corresponding bit and a magnitude representative of the confidence in the estimation. Thus, a soft bit, which is coded on several hard bits may have theoretically a value comprised between $-\infty$ and $+\infty$. The higher the magnitude is, the higher the confidence in the estimation is. The main device further comprises auxiliary interference reduction means or circuitry AUXIFRM for reducing the interference generated by the auxiliary device toward the main device.

Figure 9:
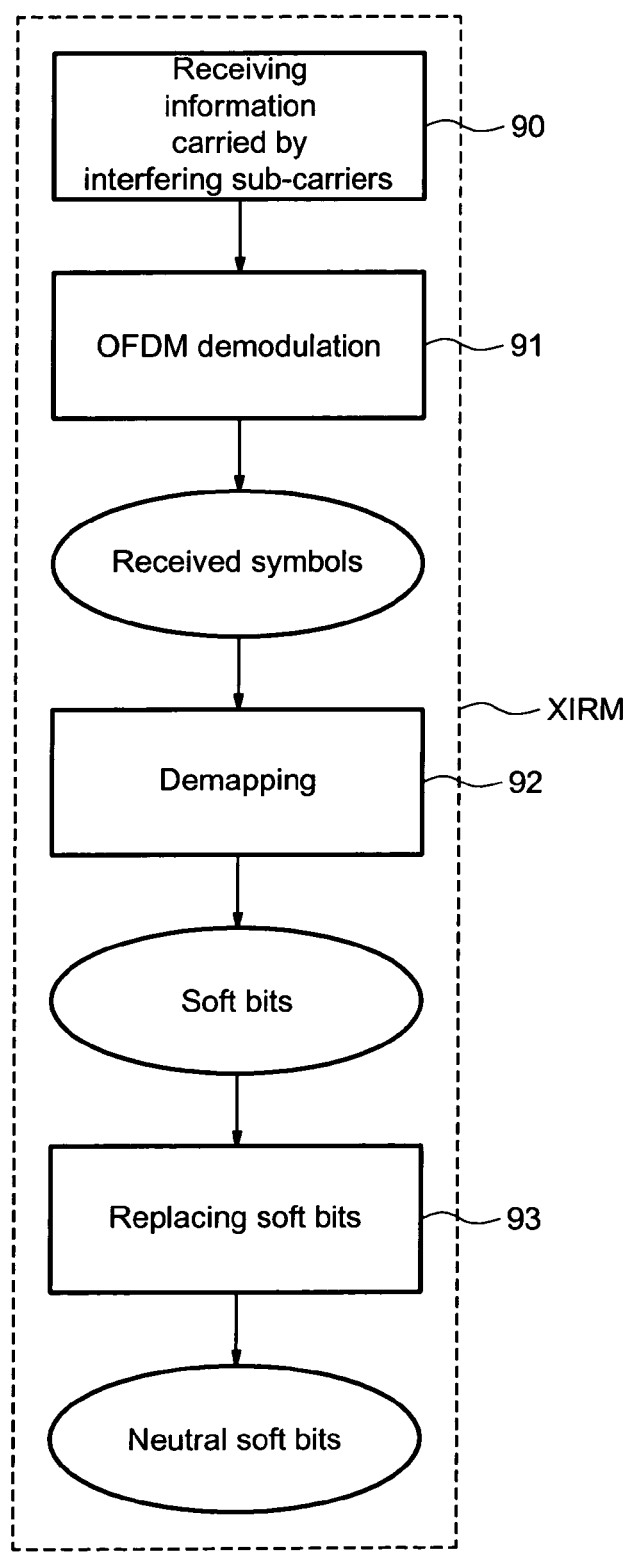
FIG. 9 is a flow chart related to another embodiment of a method according to the invention.

The auxiliary interference reduction means or circuitry AUXIFRM includes, as depicted in FIG. 8, an auxiliary processing unit XCU for replacing the soft bits corresponding to the information received on the interfering sub-carriers by neural soft bits having a magnitude equal to zero. This operation is more detailed in FIG. 9 which depicts the main steps of the auxiliary interference reduction mode XIRM.

More precisely, after receiving information carried by interfering sub-carriers (step 90), an OFDM demodulation 91 is performed. The received symbols are then demapped (step 92) and the corresponding soft bits are replaced by neutral soft bits 93.

Thus, after depuncturing in depuncturing means or circuitry DPM, the bits are decoded in a decoder DCC. The neutral soft bits are considered as being noise or information with a very low reliability. Thus, this data is corrected in the decoding process. Accordingly, the interference generated by the auxiliary device are minimized if not eliminated.

Figure 10:
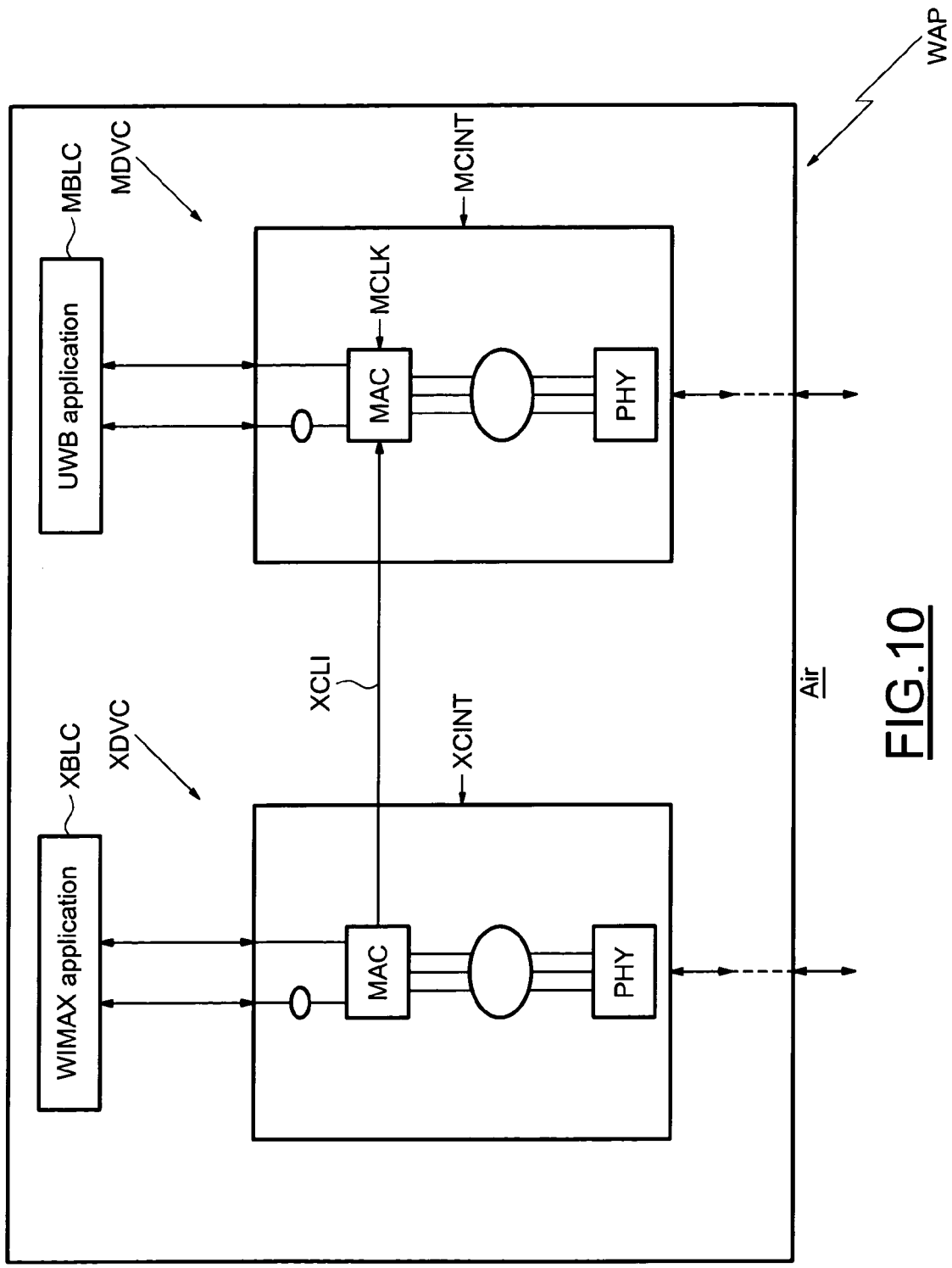
FIG. 10 illustrates diagrammatically another embodiment of a wireless communication apparatus according to the invention.

As illustrated in FIG. 10, it is possible that the wireless communication apparatus WAP incorporates both main device MDVC and auxiliary device XDVC.

In such a case, the MAC layer of the auxiliary device XDVC is able to deliver to the main management unit contained in the MAC layer of the main device MDVC an auxiliary control information XCLI representative of the operation or of the non-operation of the auxiliary device such that the main management unit is adapted to allow the operation of the main interference reduction means or circuitry only during the operation of the auxiliary device.

Further, it is not helpful to analyze the channel state information. As a matter of fact, a group of interfering sub-carriers is well known for this auxiliary device and pre-stored in the main memory means or circuitry of the main device.

Such an implementation may allow for the simultaneous operation of, for example, a WIMAX or a mobile radio and WPAN UWB air interface in a single mobile terminal. The mutual interference may be minimized if not eliminated. The overall WPAN network may not be influenced by the frequency domain coordinated transmission and reception of the co-located WPAN device. The coordinated transmission and reception of the slave WPAN air interface might lead to a reduction of the maximum reachable data rate and/or the reliability of the link. This might lead to a reduction in reach of the link.

Another approach exists for reducing the interference generated between the main device and the auxiliary device. This other approach, based on a frequency shifting, will now explain more in details with reference to FIGS. 11 to 14.

Figure 11:
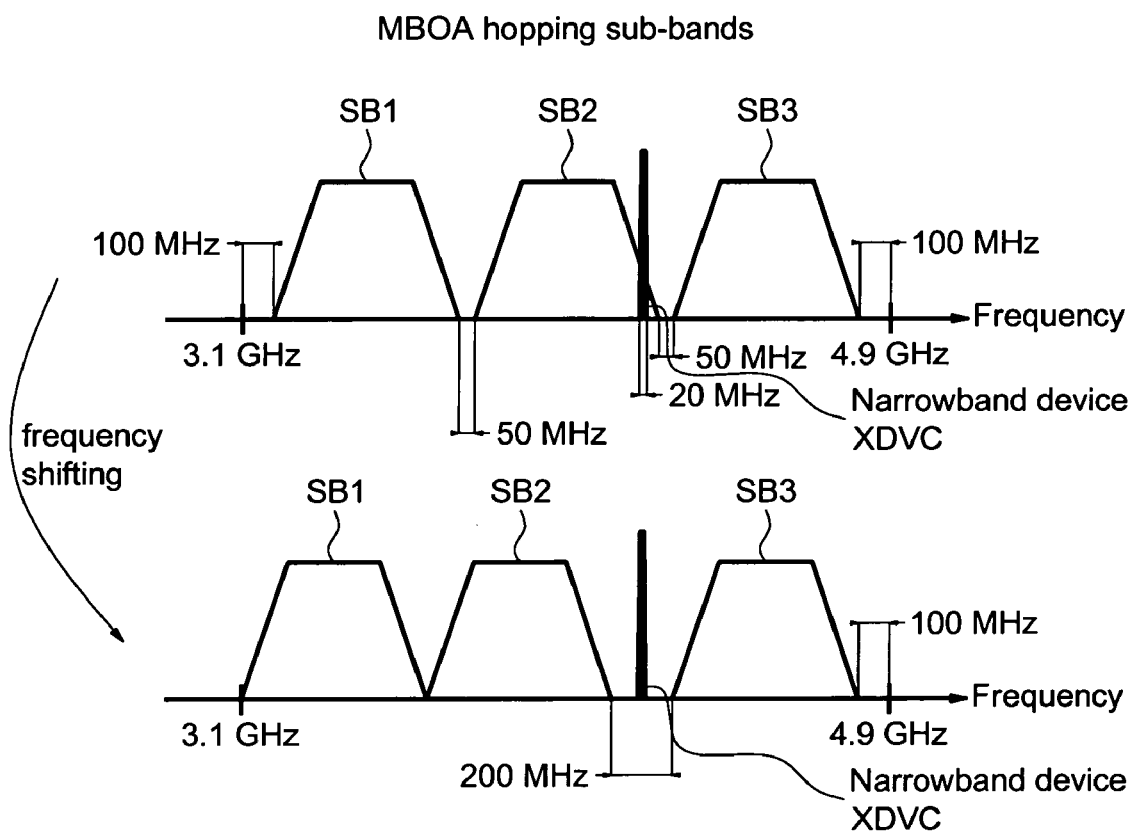
FIG. 11 illustrates another embodiment of a method according to the invention.

More precisely, in the example depicted in FIG. 11, the interference reduction is controlled by changing the carrier frequencies of the hopping sub-bands by moving the two lower bands slightly low in the frequency domain.

The narrowband device XDVC lies near the end of the second sub-band SB2. Thus, by shifting the sub-band SB1 with a shift of 100 MHz toward the low frequencies and by shifting sub-band SB2 with a shift of 150 MHz toward the low frequencies, the narrowband device XDVC lies now between sub-band SB2 and sub-band SB3.

Of course, one skilled in the art will choose the frequency shift by taking into account the guard intervals of the MBOA hopping sub-bands.

Figure 12:
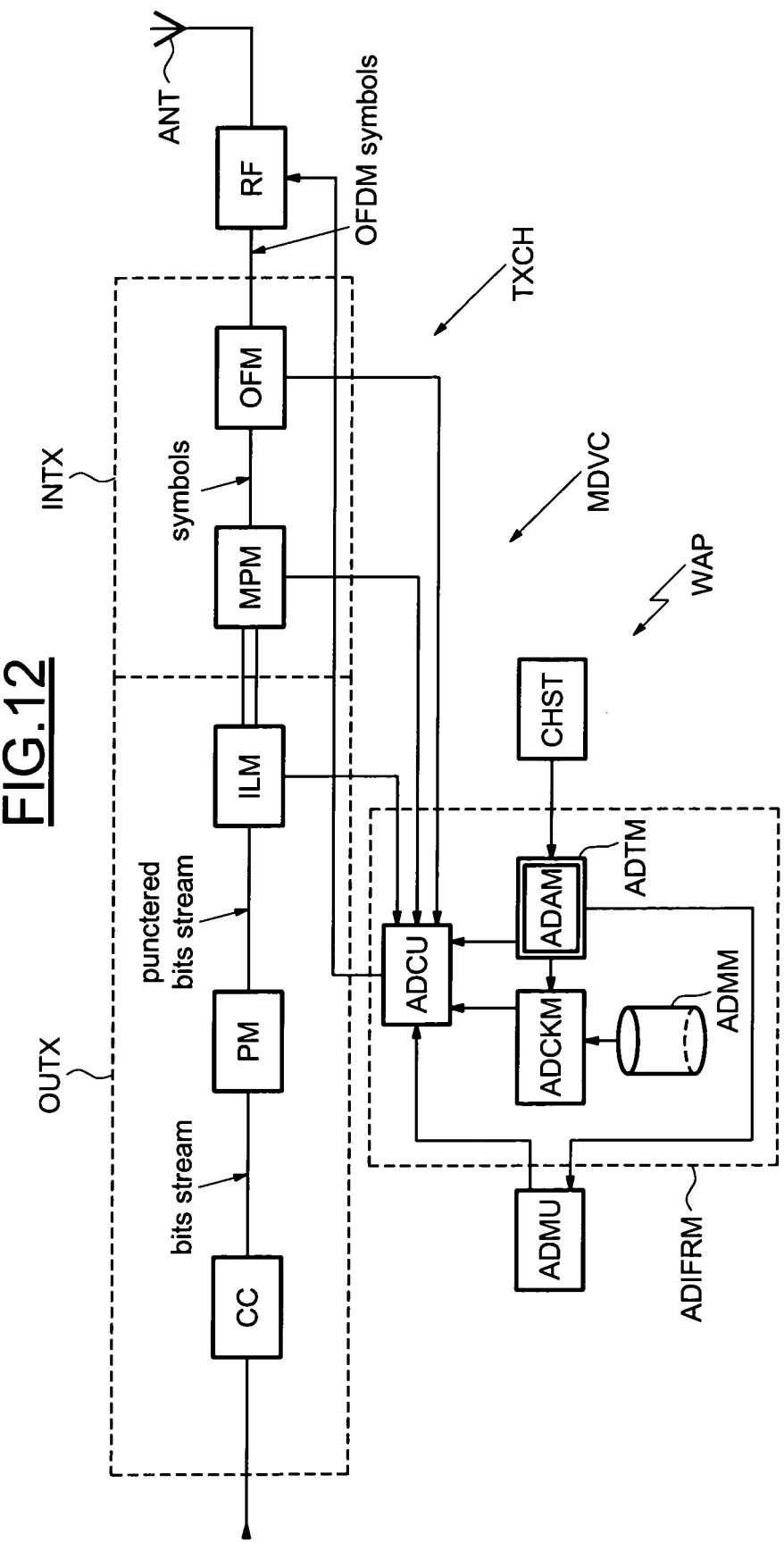
FIG. 12 illustrates diagrammatically another embodiment of an internal structure of an embodiment of a wireless communication apparatus according to the invention.

As illustrated in FIG. 12, in order to perform this controlled frequency shift, the main device MDVC of the wireless communication apparatus WAP comprises additional interference reduction means or circuitry ADIFRM for reducing the interference between the main device and auxiliary device. It can be noted that according to this variant, the frequency shifting permits minimization, if not elimination, of the interference generated by the main device MDVC toward the auxiliary device XDVC and also the interference generated by the auxiliary device XDVC toward the main device MDVC.

As for the main interference reduction means or circuitry, the additional interference reduction means or circuitry ADIFRM includes additional detecting means or circuitry ADTM for detecting an emission from and/or reception performed by the auxiliary device. An additional control unit ADCU is provided for determining the group of the interfering sub-carriers, and for shifting at least a part of the main band of frequencies including the group of interfering sub-carriers, with a chosen frequency shift.

This frequency shifting is obtained, for example, by controlling the transposition frequency of the mixers contained in the radio frequency stage RF.

Figure 13:
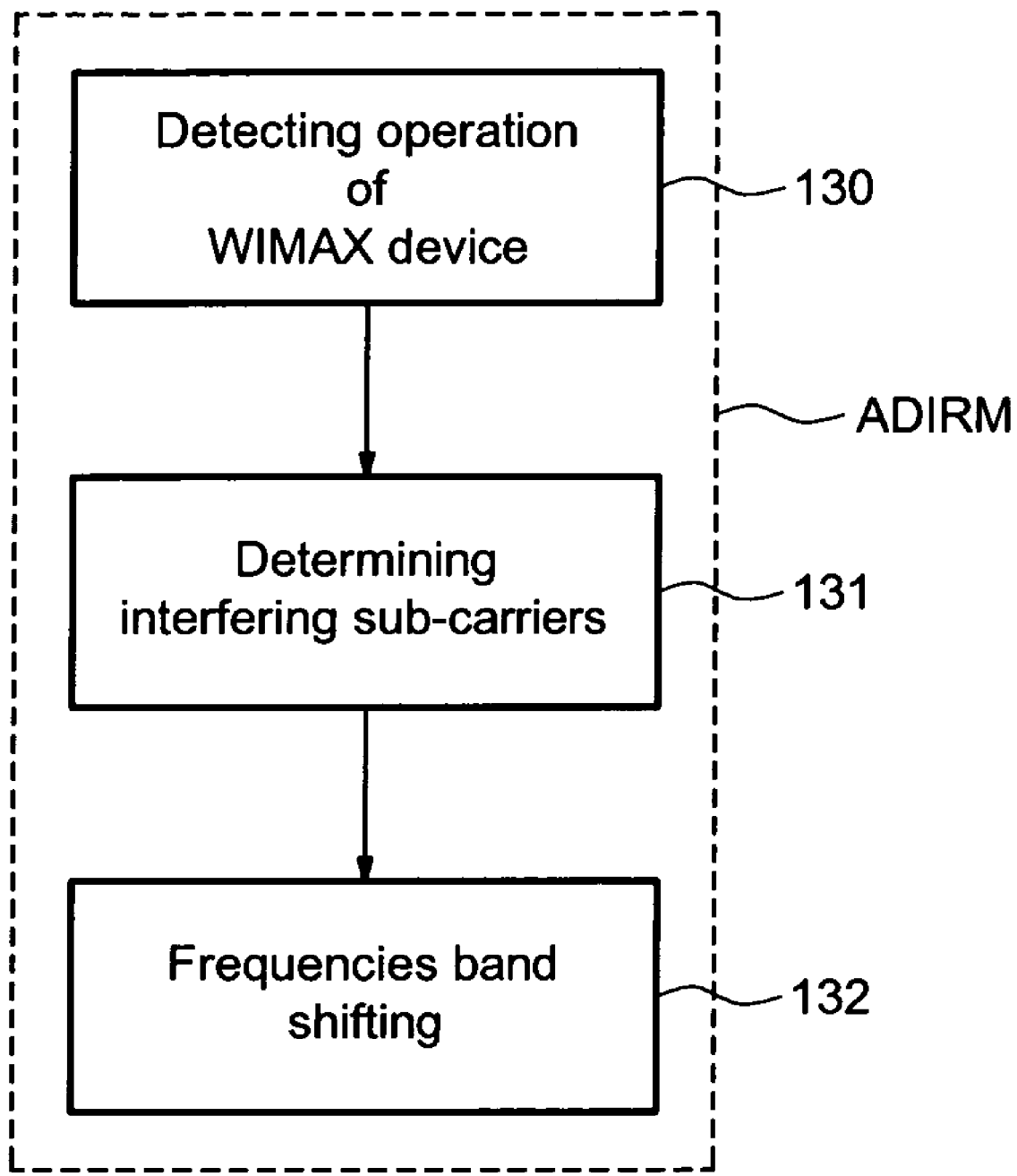
FIGS. 13 and 14 are flow charts related to another embodiment of a method according to the invention.
Figure 14:
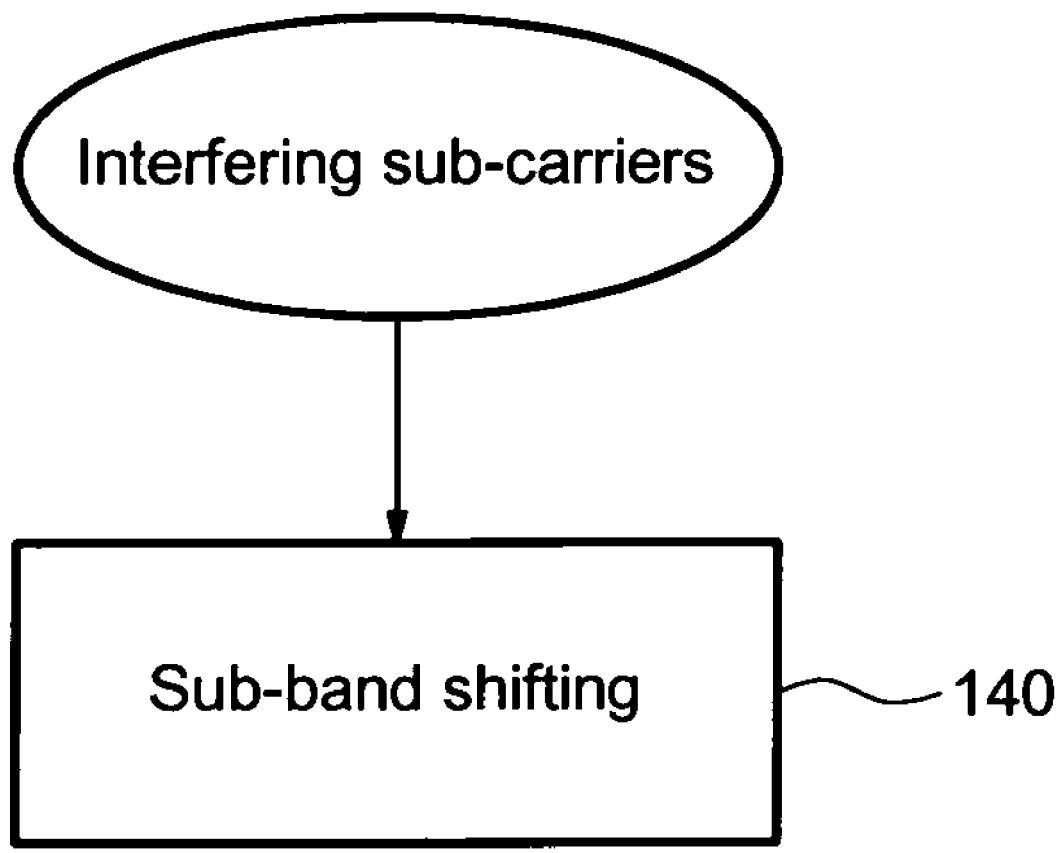

The additional interference reduction mode ADIRM, performed by the additional interference reduction means or circuitry ADIFRM, is depicted diagrammatically on FIGS. 13 and 14. More precisely, after having detected the operation of the WIMAX device (step 130), the interfering sub-carriers are determined (step 131) and the frequency band is shifted (step 132), for example by a sub-band shifting 140 (FIG. 14).

Of course, it is helpful to indicate this frequency shift to all the devices of the UWB network which are in communication with the main device. This is performed, for example, by sending control information to these devices. This control information can be sent, for example, by the MAC layer of the main device through control channels.

Further, as for the main interference reduction means or circuitry, the additional interference reduction means or circuitry ADIFRM further comprises additional analyzing means or circuitry ADAM for analyzing the channel state information delivered by the channel estimator, and additional checking means or circuitry ADCKM for checking the eventual detection of the operation of the auxiliary device by using information about the devices, pre-stored in additional memory ADMM. Further, an additional memory management unit ADMU manages the operation of the additional interference reduction means or circuitry ADIFRM, and in particular, stops the operation thereof when the auxiliary device is not detectable. In a preferred embodiment, both main and additional detection means or circuitry are identical as well as both main and additional control units and both main and additional management units. The sub-band shifting does not reduce the available resources on the air. The data rate needs not to be reduced. Thus no loss of communication performance occurs. Of course, both the main interference reduction mode (notching mode) and the additional interference reduction mode (shifting mode) can be performed for the same auxiliary device. This is the case, in particular, when the narrowband device is far enough from the end of a sub-band so that a sole frequency shifting is not enough for eliminating all the interfering sub-carriers. In such a case, the remaining interfering sub-carriers can be notched out by using the main interference reduction mode.

Although the invention has been described with the auxiliary device being a WIMAX device, such an auxiliary device could belong to a mobile radio system defined by a mobile radio standard, like for example GSM, UMTS, CDMA, EDGE or future beyond IMT-2000 systems under development. An auxiliary device could be a fixed satellite service (FSS) device or a general fixed wireless access device (FWA).

For an UMTS mobile radio device collocated with an UWB main device, the auxiliary control means or circuitry which delivers the indication of the operation of the UMTS device can be incorporated in or connected to the well-known L2 and L3 entities of the UMTS device (This is valid for the collocation in general. The UWB device could be collocated with a Wimax terminal, a satellite terminal or another mobile radio terminal.)

The invention claimed is:

1. A method for reducing interference between a main device that transmits information on sub-carriers having frequencies belonging to a main band of frequencies, the information based upon symbols obtained by a mapping of a punctured stream of bits according to a modulation mapping scheme, and at least one auxiliary device that at least one of emits and receives information within an auxiliary band of frequencies, the auxiliary band of frequencies being narrower than the main band and included within the main band, the method comprising:

performing a main interference reduction mode within the main device and comprising a detection step for detecting at least one of an emission from and a reception performed by the at least one auxiliary device;

determining from the detection step at least one interfering sub-carrier interfering with the auxiliary band of frequencies;

determining bits of the punctured stream of bits which correspond to the information carried by the at least one interfering sub-carrier; and processing the determined bits to generate processed bits mapped to a reference symbol having an amplitude within a threshold of zero, with a control indication being associated to each determined bit, and with bits associated with the control indication being mapped to the reference symbol.

2. A method according to claim 1, wherein the detection step is to detect an emission from and a reception performed by the at least one auxiliary device.

3. A method according to claim 1, wherein the processed bits are mapped to a reference symbol having an amplitude equal or close to zero.

4. A method according to claim 1, wherein the reference symbol is chosen within a group of several reference symbols having respectively different amplitudes, each amplitude within a threshold of zero.

5. A method according to claim 1, wherein processing the determined bits comprises associating a control bit to each bit of the punctured stream of bits, the control bit having either a first logical value corresponding to the control indication or a second logical value, the bits associated with the control bits having the second logical value being mapped to corresponding symbols in accordance with the modulation mapping scheme.

6. A method according to claim 1, wherein the main device is also to receive information carried by the sub-carriers and to perform a reception processing comprising determining received symbols from information received and a demapping of the received symbols for providing a punctured stream of soft bits, each soft bit having a sign representative of an estimation of a logical value of a corresponding bit and a magnitude representative of a confidence in the estimation, the method further comprising further reducing interference generated by at least one auxiliary device towards the main device, the further reducing being performed within the main device and including replacing the soft bits corresponding to the information received on the interfering sub-carriers by neutral soft bits having a magnitude within a threshold of zero.

7. A method according to claim 1, wherein the detection step of the main interference reduction mode comprises analyzing channel state information and detecting operation of the at least one auxiliary device from the channel state information.

8. A method according to claim 7, wherein the detection step further comprises checking the detecting by using a set of stored interference information respectively associated to a set of several different auxiliary devices.

9. A method according to claim 1, wherein the main interference reduction mode comprises regularly checking operation of the at least one auxiliary device and if the at least one auxiliary device is not detectable, the main interference reduction mode concerning the at least one auxiliary device is stopped.

10. A method according to claim 1, wherein the main device and the at least one auxiliary device are incorporated together within a single wireless communication apparatus.

11. A method according to claim 10, wherein an indication of the at least one interfering sub-carrier of the at least one auxiliary device is stored within the single wireless communication apparatus and the detection step of the main interference reduction mode comprises receiving from the at least one auxiliary device auxiliary control information representative of operation or non-operation of the at least one auxiliary device, the main interference reduction mode to be performed only during operation of the at least one auxiliary device.

12. A method according to claim 1, wherein several different auxiliary devices respectively at least one of emit and receive information within several different auxiliary bands of frequencies, each auxiliary band being narrower than the main band and within the main band; and wherein the main interference reduction mode is performed for at least some of the several different auxiliary devices.

13. A method according to claim 1, further comprising performing an additional interference reduction mode to further reduce interference between the main device and the at least one auxiliary device, the additional interference reduction mode being performed within the main device and comprising further detecting at least one of an emission from and a reception performed by the at least one auxiliary device, determining from the further detecting at least one interfering sub-carrier interfering with the auxiliary band of frequencies, and shifting at least a part of the main band of frequencies including the at least one interfering sub-carrier with a chosen frequency shift.

14. A method according to claim 13, wherein the chosen frequency shift is at least equal to a width of a frequency band of the at least one auxiliary device.

15. A method according to claim 13, wherein the main band of frequencies is subdivided into several different mutually spaced sub-bands, and the shifting comprises shifting at least the sub-band which contains the at least one interfering sub-carrier.

16. A method according to claim 13, wherein the further detecting of the additional interference reduction mode comprises analyzing channel state information and operation detection for detecting operation of the at least one auxiliary device from the channel state information.

17. A method according to claim 16, wherein the further detecting further comprises checking the operation detection by using a set of stored interference information respectively associated to a set of several different auxiliary devices.

18. A method according to claim 13, wherein the additional interference reduction mode comprises regularly checking operation of the at least one auxiliary device and if the at least one auxiliary device is not detectable, the additional interference reduction mode concerning the not detectable at least one auxiliary device is stopped.

19. A method according to claim 13, wherein the main device and the at least one auxiliary device are incorporated together within a single wireless communication apparatus.

20. A method according to claim 19, wherein an indication of the at least one interfering sub-carrier of the at least one auxiliary device is stored within the single wireless communication apparatus and the further detecting of the additional interference reduction mode comprises receiving from the at least one auxiliary device additional control information representative of operation or non-operation of the at least one auxiliary device, the additional interference reduction mode being performed only during the operation of the at least one auxiliary device.

21. A method according to claim 13, wherein both the main interference reduction mode and the additional interference reduction mode are performed for a same auxiliary device.

22. A method according to claim 13, wherein the main interference reduction mode and the additional interference reduction mode are respectively performed for different auxiliary devices.

23. A method according to claim 1, wherein the main device belongs to a multi-carrier based Ultra Wide Band communication system.

24. A method according to claim 23, wherein the main device belongs to an OFDM based Ultra Wide Band communication system.

25. A method according to claim 1, wherein the at least one auxiliary device belongs to a fixed wireless access system defined by a mobile radio standard, like GSM, UMTS, CDMA, and EDGE.

26. A method according to claim 1, wherein the at least one auxiliary device belongs to a fixed satellite service system.

27. A wireless communication apparatus comprising:
a main device comprising
- a main transmission chain including puncturing circuitry to deliver a punctured stream of bits,
- mapping circuitry to map symbols from the punctured stream of bits in accordance with a modulation scheme,
- a transmission stage to transmit information issued from the symbols on sub-carriers having frequencies belonging to a main band of frequencies,
- main interference reduction circuitry to reduce interference generated by a main device toward at least one auxiliary device that at least one of emits and receives auxiliary information within an auxiliary band of frequencies, the auxiliary band of frequencies being narrower than the main band of frequencies and included within the main band of frequencies,
- said main interference reduction circuitry comprising main detection circuitry to detect at least one of an emission from and a reception performed by the at least one auxiliary device,
- a main control unit coupled to the main detection circuitry to determine at least one interfering sub-carrier interfering with the auxiliary band of frequencies and determining bits of the punctured stream of bits which correspond to information carried by the at least one interfering sub-carrier, and
- a main processing unit to process determined bits and map processed bits into a reference symbol having an amplitude within a threshold of zero, and to associate a control indication to each determined bit,
- said mapping circuitry to map bits associated with the control indication into the reference symbol.

28. An apparatus according to claim 27 wherein said main processing unit is to process determined bits and map processed bits into a reference symbol having an amplitude equal or close to zero.

29. An apparatus according to claim 27, wherein the reference symbol is chosen within a group of several reference symbols having respectively different amplitudes, each amplitude within a threshold of zero.

30. An apparatus according to claim 27, wherein the main processing unit is to associate a control bit to each bit of the punctured stream of bits, the control bit having a first logical value corresponding to the control indication, or a second logical value; and wherein the mapping circuitry is to map bits associated with the control bits having the second logical value into their corresponding reference symbols in accordance with the modulation scheme.

31. An apparatus according to claim 27, wherein the main device further comprises a reception chain including a receiving stage to receive information carried by the sub-carriers and to deliver received symbols from the received information, demapping circuitry to demap the received symbols according to the modulation scheme and delivering a punctured stream of soft bits, each soft bit having a sign representative of an estimation of a logical value of a corresponding bit and a magnitude representative of confidence in the estimation, the main device further comprising auxiliary interference reduction circuitry to reduce interference generated by the at least one auxiliary device toward the main device, the auxiliary interference reduction circuitry including an auxiliary processing unit to replace soft bits corresponding to information received on the at least one interfering sub-carrier by neutral soft bits having a magnitude equal to zero.

32. An apparatus according to claim 27, further comprising a channel estimation unit to deliver channel state information; and wherein the main detection circuitry comprises main analyzing circuitry to analyze channel state information and detect operation of the at least one auxiliary device from the channel state information.

33. An apparatus according to claim 32, further comprising main memory circuitry to store a set of interference information respectively associated to a set of several different auxiliary devices, and main checking circuitry to check the operation detection by using the stored set of interference information.

34. An apparatus according to claim 27, further comprising a main management unit to manage the operation of said main interference reduction circuitry, wherein said main interference reduction circuitry regularly checks operation of the at least one auxiliary device and if the at least one auxiliary device is not detectable, the main management unit is to stop reducing interferences concerning the not detectable at least one auxiliary device.

35. An apparatus according to claim 27, wherein the main device and the at least one auxiliary device are incorporated together in the wireless communication apparatus.

36. An apparatus according to claim 35, further comprising a main management unit to manage operation of said main interference reduction circuitry, and auxiliary memory circuitry to store an indication of the at least one interfering sub-carrier; and wherein the at least one auxiliary device comprises auxiliary control circuitry to deliver an auxiliary control information representative of operation or non-operation of the at least one auxiliary device, the main management unit to allow operation of said main interference reduction circuitry only during the operation of the at least one auxiliary device.

37. An apparatus according to claim 27, wherein several different auxiliary devices respectively at least one of emit and receive information within several different auxiliary bands of frequencies, each auxiliary band of frequencies being narrower than the main band of frequencies and included within the main band of frequencies; and wherein said main interference reduction circuitry is to reduce interference generated by the main device toward at least some of the several different auxiliary devices.

38. An apparatus according to claim 27, further comprising additional interference reduction circuitry to reduce interference between the main device and the at least one auxiliary device, the additional interference reduction circuitry including additional detecting circuitry to detect at least one of an emission from and a reception performed by the at least one auxiliary device, an additional control unit coupled to the additional detecting circuitry to determine at least one interfering sub-carrier interfering with the auxiliary band of frequencies, and to shift at least a part of the main band of frequencies including the at least one interfering sub-carrier with a chosen frequency shift.

39. An apparatus according to claim 38, wherein the chosen frequency shift is at least equal to a width of a frequency band of the at least one auxiliary device.

40. An apparatus according to claim 38, wherein the main band of frequencies is subdivided into several different mutually spaced sub-bands, and the additional control unit is to shift at least a sub-band which contains the at least one interfering sub-carrier.

41. An apparatus according to claim 38, further comprising a channel estimation unit to deliver channel state information; and wherein the additional detection circuitry comprises additional analyzing circuitry to analyze the channel state information and detecting operation of the at least one auxiliary device from the channel state information.

42. An apparatus according to claim 41, further comprising additional memory circuitry to store a set of interference information respectively associated to a set of several different auxiliary devices, and additional checking circuitry to check results of the additional detection circuitry by using the stored set of interference information.

43. An apparatus according to claim 38, further comprising an additional management unit to manage operation of the additional interference reduction circuitry; and wherein the additional interference reduction circuitry is to regularly check operation of at least one auxiliary device and if the at least one auxiliary device is not detectable the additional management unit is to stop reducing interference concerning the not detectable at least one auxiliary device.

44. An apparatus according to claim 38, wherein the main device and the at least one auxiliary device are incorporated together within a single wireless communication apparatus.

45. An apparatus according to claim 44, further comprising an additional management unit to manage operation of the additional interference reduction circuitry, and additional memory circuitry to store an indication of the at least one interfering sub-carrier of at least one auxiliary device; and wherein the at least one auxiliary device comprises auxiliary control circuitry to deliver auxiliary control information representative of operation or non-operation of the at least one auxiliary device, the additional management unit to allow operation of said main interference reduction circuitry only during the operation of the at least one auxiliary device.

46. An apparatus according to claim 38, wherein both said main interference reduction circuitry and the additional interference reduction circuitry are to perform their respective interference reduction for a same auxiliary device.

47. An apparatus according to claim 38, wherein said main interference reduction circuitry and the additional interference reduction circuitry are to perform their respective interference reduction for different auxiliary devices.

48. An apparatus according to claim 38, wherein both the main detection circuitry and additional detecting circuitry are identical, and the main control unit and the additional control unit are identical.

49. An apparatus according claim 38, wherein the main device belongs to a multi-carrier based Ultra Wide Band communication system.

50. An apparatus according to claim 49, wherein the main device belongs to an OFDM based Ultra Wide Band communication system.

51. An apparatus according to claim 49, wherein a physical layer of the main device incorporates each interference reduction circuitry.

52. An apparatus according to claim 27, wherein the at least one auxiliary device belongs to a fixed wireless access system defined by at least one mobile radio standard of GSM, UMTS, CDMA, and EDGE.

53. An apparatus according to claim 27, wherein the at least one auxiliary device belongs to a fixed satellite service system.

* * * * *